(12) United States Patent
Kim et al.

(10) Patent No.: US 9,291,231 B2
(45) Date of Patent: Mar. 22, 2016

(54) FREQUENCY SENSITIVE TYPE SHOCK ABSORBER

(71) Applicant: MANDO CORPORATION, Pyeongtaek-Si, Gyeonggi-do (KR)

(72) Inventors: Hark Joo Kim, Seoul (KR); Tae Ju Kim, Yongin-si (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 14/287,996

(22) Filed: May 27, 2014

(65) Prior Publication Data
US 2014/0353097 A1    Dec. 4, 2014

(30) Foreign Application Priority Data

May 28, 2013    (KR) .......................... 10-2013-0060544

(51) Int. Cl.
F16F 9/512    (2006.01)

(52) U.S. Cl.
CPC ..................................... *F16F 9/5126* (2013.01)

(58) Field of Classification Search
CPC .......... B62D 7/22; B60G 17/08; G01G 23/08; F15B 11/076; F16F 9/20; F16F 9/26; F16F 9/34; F16F 9/44; F16F 9/46; F16F 9/325; F16F 9/348; F16F 9/516; F16F 9/3485; F16F 9/5126
USPC ......................... 188/313, 280, 322.13, 322.15
See application file for complete search history.

(56) References Cited

U.S. PATENT DOCUMENTS

| | | | | |
|---|---|---|---|---|
| 3,570,635 A * | 3/1971 | Takagi | ...................... | F16F 9/50 188/196 R |
| 6,220,409 B1 * | 4/2001 | Deferme | ............... | F16F 9/3228 188/282.1 |
| 6,561,326 B2 * | 5/2003 | Gotz | ...................... | F16F 9/5126 188/282.5 |
| 6,918,473 B2 * | 7/2005 | Deferme | ............... | F16F 9/5126 188/282.1 |
| 2004/0149530 A1 * | 8/2004 | Drees | .................... | F16F 6/5126 188/322.15 |
| 2009/0145708 A1 * | 6/2009 | Kim | ...................... | F16F 9/5126 188/322.15 |
| 2012/0312648 A1 * | 12/2012 | Yu | ........................ | F16F 9/5126 188/280 |

FOREIGN PATENT DOCUMENTS

| | | |
|---|---|---|
| CN | 100422591 C | 10/2008 |
| JP | 5078574 B2 | 9/2012 |

* cited by examiner

*Primary Examiner* — Anna Momper
*Assistant Examiner* — San Aung
(74) *Attorney, Agent, or Firm* — McDermott Will & Emery LLP

(57) ABSTRACT

A frequency sensitive type shock absorber is provided. A housing has a bypass hole formed such that an upper portion of a chamber part is opened to connect to the opening, and a lower portion of the chamber part communicates with the compression chamber. A spool is formed within the chamber part and is elevated by a fluid flowing into the chamber part. A pair of partition members partitions the chamber part into upper and lower chambers and provides a restoring force to the spool. A guide member is formed between the pair of the partition members, has a elastic force, and guides the partition members to maintain positions thereof. A pair of elastic members is formed in the upper and lower chambers to prevent a fluid from penetrating between the pair of the partition members and the side of the chamber part, and assist a restoration of the partition members by elasticity.

6 Claims, 3 Drawing Sheets

FREQUENCY SENSITIVE TYPE SHOCK ABSORBER

CROSS-REFERENCE(S) TO RELATED APPLICATION

This application claims priority of Korean Patent Application No. 10-2013-0060544, filed on May 28, 2013, in the Korean Intellectual Property Office, the contents of which are incorporated herein by reference in its entirety.

BACKGROUND OF THE INVENTION

1. Field of the Invention

The present invention relates to a frequency sensitive type shock absorber, and more particularly, to a frequency sensitive type shock absorber which is capable of minimizing a rise in costs and is advantageous to the design of basic components in implementing performance showing different characteristics according to frequency areas so as to maximize a ride comfort.

2. Description of the Related Art

In general, suspension systems are installed in vehicles so as to improve a ride comfort by absorbing and damping a vibration or shock which is transferred from a road surface to an axle during driving. As one of such suspension systems, a shock absorber is used.

The shock absorber is installed between an axle and a vehicle body, and includes a cylinder in which a piston rod is movably installed.

In addition, the cylinder is filled with gas or oil. A damping force is generated while the oil is moved by a piston valve installed in an end portion of the piston rod.

However, such a general shock absorber has a limitation in that it has a constant damping force characteristic with respect to a condition of a road surface or a posture change of a vehicle. Therefore, in the case of decreasing the damping force characteristic, the ride comfort can be improved, but the posture of the vehicle cannot be stably maintained.

On the contrary, in the case of increasing the damping force characteristic, the posture of the vehicle can be stably maintained, but the ride comfort is deteriorated. Therefore, there is a problem that the damping force characteristic of the shock absorber cannot be adjusted according to the condition of the road surface or the posture of the vehicle.

A frequency sensitive type shock absorber has been developed which can more finely adjust a damping force characteristic according to a condition of a road surface or a posture change of a vehicle so as to improve a ride comfort. Such a conventional frequency sensitive type shock absorber is disclosed in Korean Patent Publication No. 10-2013-0025818.

However, such a conventional frequency sensitive type shock absorber limits its driving by using a slidable free piston and a caulking spring to absorb a fluid and open/close a passage.

Therefore, a long stroke is required for absorbing a necessary amount of a fluid. Due to a large momentum, a noise is generated by a contact of a free piston, and a durability of a part is degraded.

Furthermore, a structure for opening/closing a passage is complicated for implementing performance. Since a large number of parts are used, costs are increased and it is disadvantageous to mass production and automation.

SUMMARY OF THE INVENTION

The present invention has been made in an effort to solve the above problems and is directed to provide a frequency sensitive type shock absorber which is capable of minimizing a rise in costs, has a simplified structure, and is advantageous to the design of basic components.

According to the present invention, there is provided a frequency sensitive type shock absorber, which includes a cylinder and a piston valve partitioning the cylinder into a rebound chamber and a compression chamber, the frequency sensitive type shock absorber including: an inner passage which connects a through-hole formed in a side of the piston rod to an opening formed in a lower portion thereof; a housing which is connected to a lower portion of the piston rod and in which a chamber part is formed, the housing including a bypass hole formed such that an upper portion of the chamber part is opened to connect to the opening and a lower portion of the chamber part communicates with the compression chamber; a spool which is formed within the chamber part and is elevated by a fluid flowing into the chamber part; a pair of partition members that extends from a side of the chamber part to an outer periphery of the spool to partition the chamber part into an upper chamber and a lower chamber, and provides a restoring force to the spool; a guide member which is formed between the pair of the partition members, has a elastic force, and guides the pair of the partition members to maintain a position thereof; and a pair of elastic members which are formed in the upper chamber and the lower chamber to prevent a fluid from penetrating between the pair of the partition members and the side of the chamber part, and assist a restoration of the partition members by elasticity.

A lower portion of the chamber part may be opened, and the chamber part may include: an insertion groove which is recessed along an inner periphery in the lower portion of the chamber part; and a washer member which is fitted into the insertion groove and has a bypass hole in a central portion.

The spool may include: an upper guide protrusion which protrudes from an upper central portion; a lower guide protrusion which protrudes from a lower central portion; and a spacer protrusion which protrudes along a side periphery.

The upper guide protrusion may be inserted into the opening, the lower guide protrusion may be inserted into the bypass hole, and the spacer protrusion may be fitted between the pair of the partition members to guide the elevation of the spool.

The pair of the partition members may have a passage on a width surface.

The guide member may be made of an elastic member.

The spool may block an upper or lower portion of the chamber part so as to prevent a fluid from passing through the chamber part according to an amount of the fluid at the time of a low frequency.

DETAILED DESCRIPTION OF EXEMPLARY EMBODIMENTS

Hereinafter, exemplary embodiments of the present invention will be described in detail with reference to the accompanying drawings.

Figure 1:
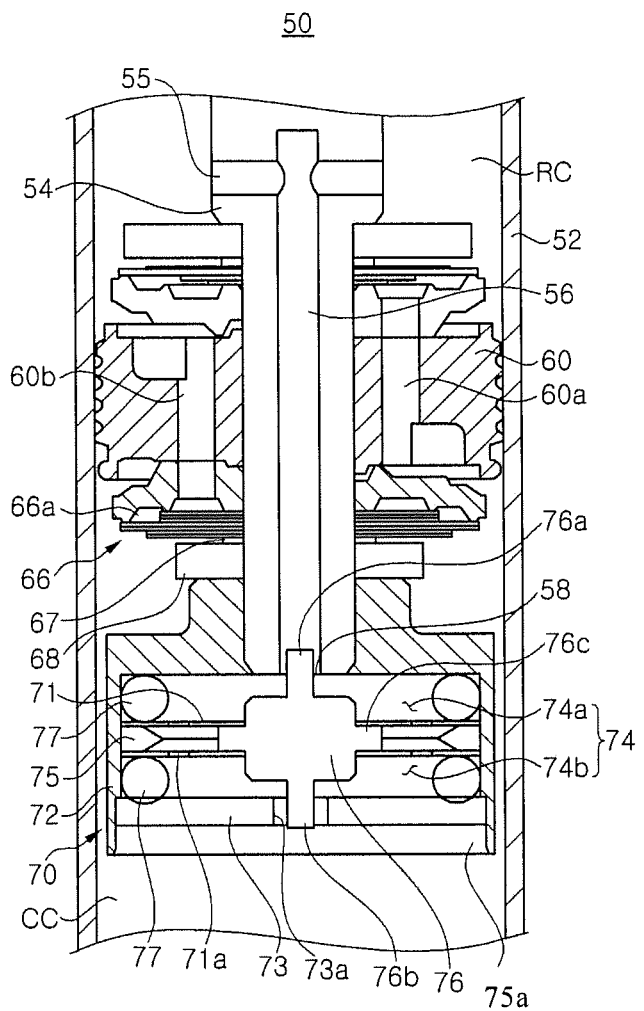
FIG. 1 is a sectional view schematically illustrating main parts of a frequency sensitive type shock absorber according to the present invention.

FIG. 1 is a sectional view schematically illustrating main parts of a frequency sensitive type shock absorber according to the present invention.

As illustrated in FIG. 1, the shock absorber 50 according to the present invention includes a cylinder 52 connected to a wheel side of a vehicle, and a piston rod 54 connected to a vehicle body side. The cylinder 52 may be provided with a dual structure including an inner tube and an outer tube, or may be provided with a single tube.

The piston rod 54 is reciprocatably installed in the cylinder 52, and a piston valve 60 is installed in an end portion thereof to partition the inside of the cylinder 52 into a compression chamber CC and a rebound chamber RC and generate a damping force.

A compression passage 60a may be formed in one side of the piston valve 60, and a rebound passage 60b may be formed in the other side thereof.

The compression passage 60a and the rebound passage 60b are passages formed such that a fluid can be moved between the compression chamber CC and the rebound chamber RC in a compression stroke and a rebound stroke during which the piston rod 54 moves up and down.

In addition, a valve disk 66 is installed under the piston valve 60 to control the degree of opening of the rebound passage 60b in low-speed and high-speed sections and generate different damping forces.

A retainer 67 is sequentially installed under the valve disk 66.

The valve disk 66 may include at least one or more valve disk. A plurality of valve disks may be installed for varying a damping force characteristic, and may have various shapes. A slit 66a may be formed in a portion of the valve disk 66.

On the other hand, the piston rod 54 has an inner passage 56 which connects the rebound chamber RC to the compression chamber CC.

To this end, a through-hole 55 communicating with the rebound chamber RC is formed in a side of the piston rod 54, and an opening 58 for connection to the compression chamber (CC) side is formed under the piston rod 54.

The inner passage 56 is formed by connecting the through-hole 55 to the opening 58 in the inside of the piston rod 54.

In addition, a damping force control unit 70 is installed under the piston rod 54 to vary the damping force according to a movement displacement of the piston rod 54.

The damping force control unit 70 includes a housing 72 connected to a lower portion of the piston rod 54.

At this time, a spacer 68 is installed between the housing 72 and the retainer 67, and supports the housing 72 and the retainer 67 to be maintained at a constant distance.

A chamber part 74 is formed inside the housing 72. An upper portion of the chamber part 74 is opened to be connected to the opening 58 of the piston rod 54.

A lower portion of the chamber part 74 is opened, and an insertion groove 75a is formed along an inner periphery of the lower portion of the chamber part 74.

Furthermore, a washer member 73 is fitted into the insertion groove 75a, and a bypass hole 73a is formed to penetrate a central portion of the washer member 73, such that the compression chamber CC communicates with the chamber part 74.

At this time, since an end portion of the insertion groove 75a is curled (see FIGS. 2 and 3), the washer member 73 fitted into the insertion groove 75a can be fixed.

Furthermore, a spool 76 is installed in a center of the chamber part 74. The spool 76 may be formed to have a 3D shape, such as a hexagonal shape, a diamond shape, an oval shape, or a circular shape. An upper guide protrusion 76a protrudes from an upper central portion of the spool 76, and a lower guide protrusion 76b protrudes from a lower central portion of the spool 76. A spacer protrusion 76c protrudes from a side periphery of the spool 76.

The spool 76 is installed to be elevatable according to a flow of a fluid. The upper guide protrusion 76a is inserted into the opening 58 and the lower guide protrusion 76b is inserted into the bypass hole 73a. In this manner, the upper guide protrusion 76a and the lower guide protrusion 76b serve to guide the spool 76 so as to prevent the spool 76 from being deviated when the spool 76 is elevated.

A partition member 71 extending from a side of the chamber part 74 to an outer periphery of the spool 76 is formed inside the chamber part 74 to partition the chamber part 74 into an upper chamber 74a and a lower chamber 74b.

The partition member 71 is provided with a pair of members. The spacer protrusion 76c is formed in a sandwich type such that the spacer protrusion 76c is inserted between the pair of the partition members 71 and the inner periphery side. A passage 71a is formed on a width surface such that the upper chamber 74a communicates with the lower chamber 74b.

A ring-shaped guide member 75 is inserted between the pair of the partition members 71 and the outer periphery side.

At this time, the guide member 75 is made of an elastic material. A pair of elastic members 77 is installed in the upper chamber 74a and the lower chamber 74b.

The pair of the elastic members 77 has a watertight structure that prevents a fluid from penetrating between the pair of the partition members 71 and the side of the chamber part 74 while supporting the pair of the partition members 71 from the top surface of the chamber part 74 and the washer member 73.

Figure 2:
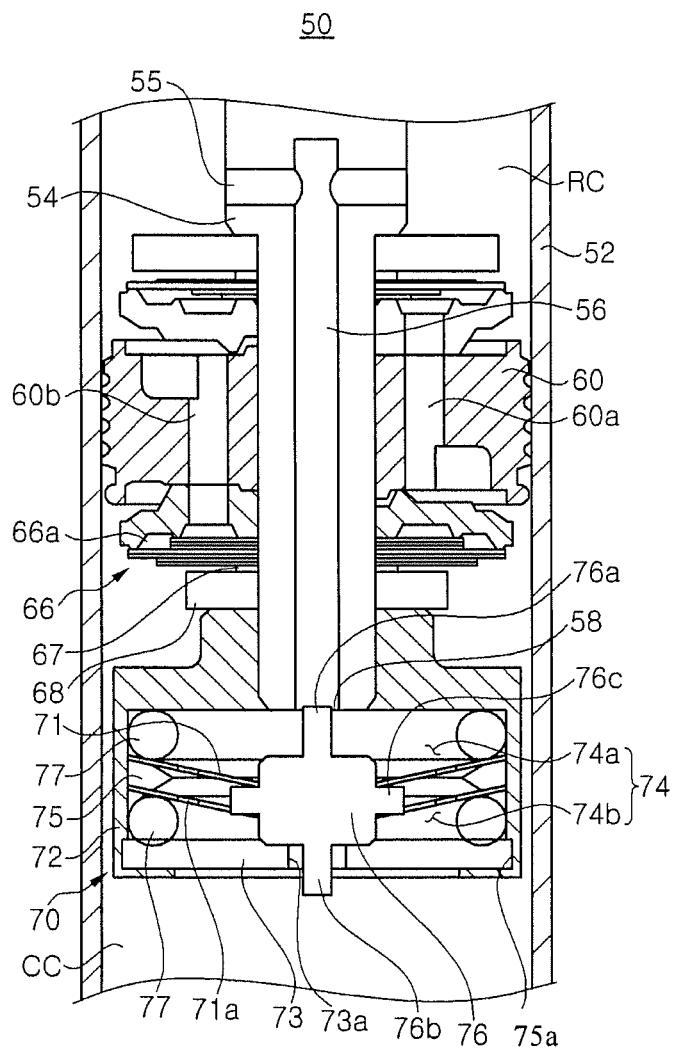
FIG. 2 is a cross-sectional view schematically illustrating an operation state during a rebound stroke of the frequency sensitive type shock absorber in FIG. 1.
Figure 3:
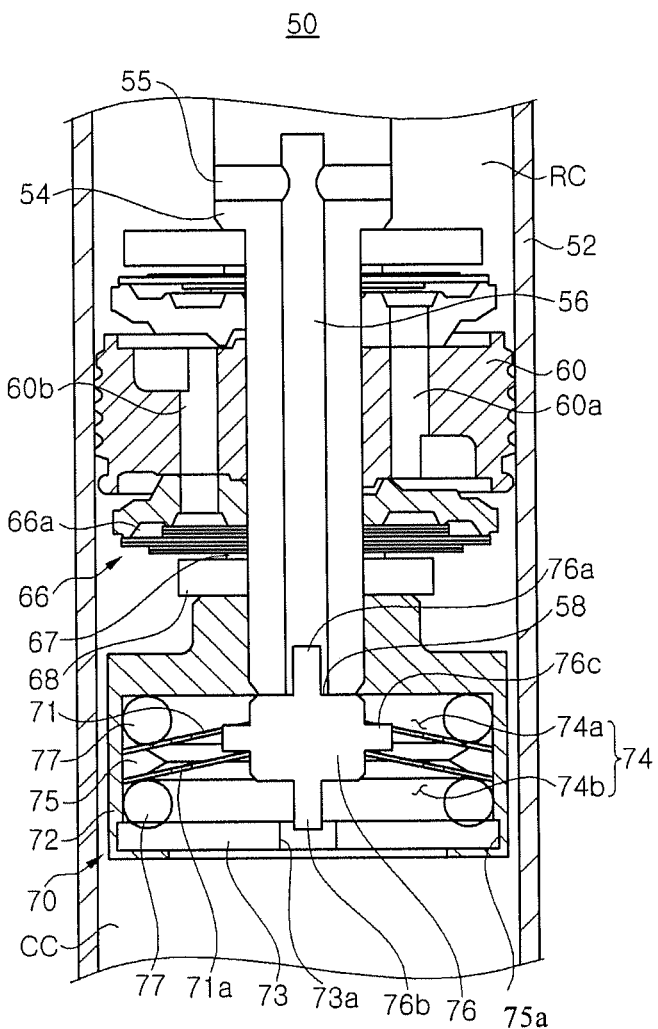
FIG. 3 is a cross-sectional view schematically illustrating an operation state during a compression stroke of the frequency sensitive type shock absorber in FIG. 1.

FIG. 2 is a cross-sectional view schematically illustrating an operation state during a rebound stroke of the frequency sensitive type shock absorber in FIG. 1, and FIG. 3 is a cross-sectional view schematically illustrating an operation state during a compression stroke of the frequency sensitive type shock absorber in FIG. 1

As illustrated in FIGS. 2 and 3, the pair of the partition members 71 is deformed along the spool 76 as the spool 76 is elevated. The pair of the partition members 71 is restored to the original position by their own elasticity, and the spool 76 is also restored to the original position.

At this time, the guide member 75, which is formed between the pair of the partition members 71, and the pair of the elastic members 77, which tightly contacts the upper and lower sides of the pair of the partition members 71, assist the restoration of the partition members 71 by providing a restoring force for restoring the partition members 71 to the original position due to the elasticity.

Therefore, in the frequency sensitive type shock absorber according to the present invention, when more than a predetermined amount of a fluid flows into the chamber part 74 in a rebound state in a low-frequency section, the spool 76 moves down to block the bypass hole 73a so that the fluid does not flow into the compression chamber CC through the chamber part 74. When more than a predetermined amount of a fluid flows into the chamber part 74 in a compression state in a low-frequency section, the spool 76 moves up to block the opening 58 so that the fluid does not flow into the rebound chamber RC through the chamber part 74.

Consequently, when more than a predetermined amount of the fluid flows into the chamber part 74, the damping force control unit 70 generates a high damping force in a low-frequency section, and generates a low damping force in a high-frequency section.

As described above, the frequency sensitive type shock absorber according to the present invention can obtain the effect that reduces costs through the simplification of part structures and configurations of the damping force control unit for generating the damping force depending on the frequency.

In addition, it is advantageous to the design of the shock absorber by minimizing basic components of the damping force control unit.

Furthermore, the tuning of the shock absorber is facilitated by adjusting the thickness of the partition member and the size of the passage.

As described above, the frequency sensitive type shock absorber according to the present invention can reduce costs by simplifying part structures and configurations.

In addition, it is advantageous to the design of the shock absorber by minimizing basic components.

Furthermore, the tuning of the shock absorber is facilitated by adjusting the thickness of the partition members and the size of the passage.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
|---|---|
| 11: shock absorber | 52: cylinder |
| 54: piston rod | 55: through-hole |
| 56: inner passage | 60: piston valve |
| 60a: compression passage | 60b: rebound passage |
| 66: valve disk | 66a: slit |
| 67: retainer | 68: spacer |
| 70: damping force control unit | 71: partition member |
| 72: housing | 73: washer member |
| 73a: bypass hole | 74: chamber part |
| 74a: upper chamber | 74b: lower chamber |
| 76: spool | 76a: upper guide protrusion |
| 76b: lower guide protrusion | 76c: spacer protrusion |
| 77: elastic member | |

What is claimed is:

1. A frequency sensitive type shock absorber, which includes a cylinder and a piston valve partitioning the cylinder into a rebound chamber and a compression chamber, the frequency sensitive type shock absorber comprising:
    an inner passage which connects a through-hole formed in a side of the piston rod to an opening formed in a lower portion thereof;
    a housing which is connected to a lower portion of the piston rod and in which a chamber part is formed, the housing including a bypass hole formed such that an upper portion of the chamber part is opened to connect to the opening, and a lower portion of the chamber part communicates with the compression chamber;
    a spool which is formed within the chamber part and is elevated by a fluid flowing into the chamber part;
    a pair of partition members which extend from a side of the chamber part to an outer periphery of the spool to partition the chamber part into an upper chamber and a lower chamber and provide a restoring force to the spool, and each of partition members having a passage on a width surface thereof between the upper chamber and the lower chamber such that the upper and lower chambers communicate with each other;
    a guide member which is formed between the pair of the partition members, has an elastic force, and guides the pair of the partition members to maintain a position thereof; and
    a pair of elastic members which are formed in the upper chamber and the lower chamber to prevent the fluid from penetrating between the pair of the partition members and the side of the chamber part, and assist a restoration of the partition members by elasticity.

2. The frequency sensitive type shock absorber according to claim 1, wherein a lower portion of the chamber part is opened, and the chamber part comprises:
    an insertion groove which is recessed along an inner periphery in the lower portion of the chamber part; and
    a washer member which is fitted into the insertion groove and has a bypass hole in a central portion.

3. The frequency sensitive type shock absorber apparatus of claim 1, wherein the spool comprises:
    an upper guide protrusion which protrudes from an upper central portion;
    a lower guide protrusion which protrudes from a lower central portion; and
    a spacer protrusion which protrudes along a side periphery and is spaced apart from an inner side surface of the housing such that the guide member, which tightly contacts upper and lower sides of the spacer protrusion, is disposed between the spacer protrusion and the inner side surface in a width direction.

4. The frequency sensitive type shock absorber according to claim 3, wherein
    the upper guide protrusion is inserted into the opening,
    the lower guide protrusion is inserted into the bypass hole, and
    the spacer protrusion is fitted between the pair of the partition members to guide the elevation of the spool.

5. The frequency sensitive type shock absorber according to claim 1, wherein the guide member is made of an elastic member.

6. The frequency sensitive type shock absorber according to claim 1, wherein the spool blocks the upper or lower portion of the chamber part to prevent the fluid from passing through the chamber part according to the amount of the fluid at the time of a low frequency.

* * * * *